March 16, 1965     T. D. NATHAN     3,173,699
ANNULAR GASKET

Filed Aug. 24, 1962                           3 Sheets-Sheet 1

INVENTOR.
TRACY D. NATHAN
BY
ATTORNEY

March 16, 1965  T. D. NATHAN  3,173,699
ANNULAR GASKET

Filed Aug. 24, 1962  3 Sheets-Sheet 3

INVENTOR.
TRACY D. NATHAN
BY
ATTORNEY

3,173,699
ANNULAR GASKET

Tracy D. Nathan, Cuyahoga Falls, Ohio, assignor to Hamilton Kent Manufacturing Co., Kent, Ohio, a corporation of Ohio
Filed Aug. 24, 1962, Ser. No. 219,318
8 Claims. (Cl. 277—206)

This invention relates to an annular gasket of elastomeric material of the type used between an inner and outer section of pipe, such as a bell and spigot joint. It is designed more particularly for use in a pipe carrying a liquid under pressure, but may be used where the liquid is not under pressure; and in wet surroundings, as in a swamp, etc., it can be used advantageously in a pipe carrying either a gas or a liquid.

The body of the gasket usually tapers from a smaller radial thickness at the front to a greater radial thickness at the rear. At the rear are two annular tapering lips, one adapted to be pressed into contact with each of the respective opposing surfaces of the pipe sections. There are several annular openings spaced at intervals through the body of the gasket. These openings have curved walls, the rear one usually having a shorter axis parallel to the pipe surfaces than perpendicular thereto and the other openings usually being generally circular in cross section. The inner and outer walls of the gasket are corrugated, with a projection on each side of the rear opening and preferably also on each side of each of the other openings to apply pressure to the openings as the gasket is tightened between pipe sections.

At the forward end of each of the tapering lips—where it is joined to the body of the gasket—there is a depression in the gasket which facilitates the outward flexing of the lips. To the rear of this depression each lip is quite thick and their inner surfaces are very close to one another, i.e. they are substantially in contact. These surfaces flare outwardly to the rear, forming a mouth leading into an annular opening in the gasket immediately in front of these thick portions of the lips. When the gasket is squeezed, air escapes from this opening out through the mouth. The lips taper backwardly from these thick portions to substantial knife edges at their rear. As will be explained, either the outer or inner surface of the gasket is intended to be positioned against the wall of one of the pipes before the pipes are brought together, and the outside surface of the lip on this side of the gasket is substantially in line with the taper of the wall of the body of the gasket. On the other surface of the gasket the outside surface of the lip is generally parallel to the taper of the wall of the gasket but is offset inwardly.

If the gasket is to be used in some location where the forward end abuts a radial wall, this forward end is preferably flat. Otherwise, it is preferably rounded.

When the gasket is in use and liquid pressure is directed from the rear of the gasket against the lips, the liquid enters the mouth between the lips and spreads them against the walls of the pipe sections. Also, the squeezing pressure of the pipes on the body of the gasket immediately in front of the lips causes the lips to flare outward.

If the pipe is carrying a liquid under pressure the lips are directed toward the interior of the pipe. However, if the pipe is laid in swampy ground or other surroundings where it will be subjected to hydrostatic pressure, the lips are directed toward the exterior of the pipe to exclude the water, and in this case the pipe may be used for conveying a gas or a liquid.

The invention is described in connection with the accompanying drawings, in which.

Figure 1:
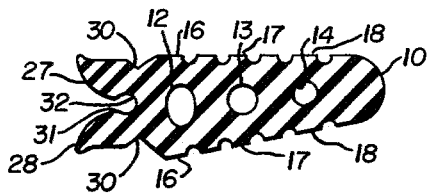
FIGURE 1 is a cross section of a wider form of the gasket with a rounded forward end.

The drawings show the concrete pipe section 1 provided with a bell 2 and metal ring 3; and the concrete pipe section 4 provided with a spigot 5 and metal shroud 6. The inner pipe section tapers at 7 in approaching the spigot 6. The gaskets can be used between a concrete bell and concrete spigot; and alternatively the pipes need not be provided with a bell and spigot but may be of other suitable construction.

Figure 2:
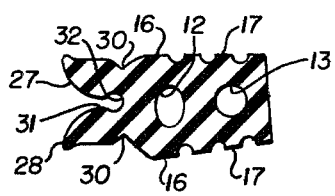
FIGURE 2 is a cross section of a truncated form of the gasket with a blunt forward end.
Figure 3:
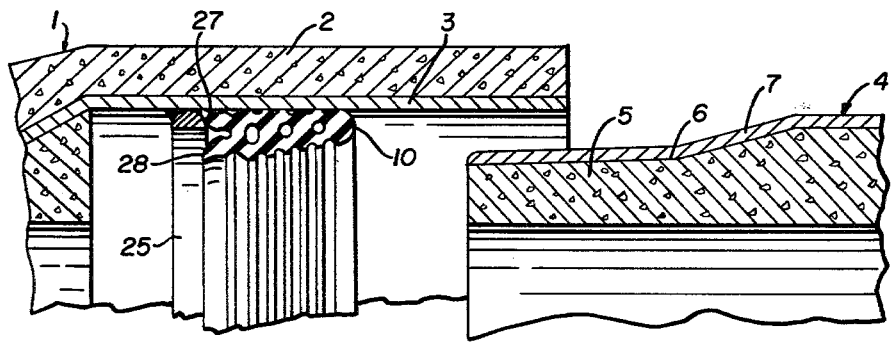
FIGURES 3, 4 and 5 are cross sections which show the gasket in FIGURE 1 being squeezed into sealing relation between two pipe sections.
Figure 4:
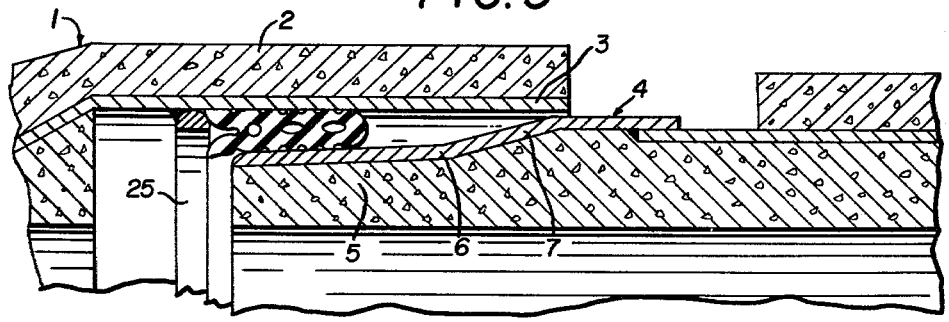
Figure 5:
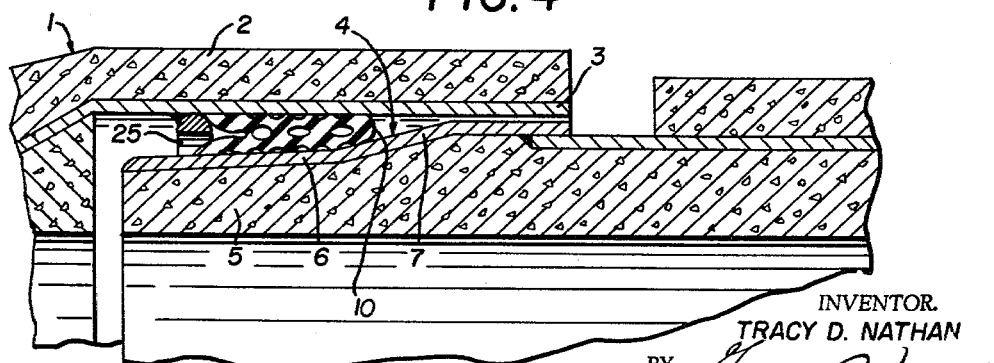

The truncated type of gasket shown in FIGURE 2 is identical with that shown in FIGURE 1 except that the rounded forward end is omitted and the opening nearest the lips is circular instead of oval in cross section. It is desirable to round the forward end if the gasket is to be seated in a joint such as shown in FIGURES 3 to 5 where one pipe wall tapers at 7 toward the other pipe wall.

The inner and outer walls of the gasket usually taper toward the front to facilitate the telescoping of two pipes over the gasket. As shown in FIGURE 5, the rounded forward end 10 is designed to be located between the tapering portion 7 of the pipe and the bell 2 (each shown as covered with metal).

There are three annular openings 12, 13 and 14 in the gasket of FIGURE 1. In the truncated form, one of these openings is omitted. The number of openings is not critical. The openings are small so that when the gasket is compressed in use, and the air or gas entrained in the openings leaks out, the gasket will still be compressed. The forward openings are preferably circular in cross section, and the rear opening is preferably oval with the axis which is parallel to the pipe surfaces advantageously shorter than the axis perpendicular thereto. The walls of the gasket are corrugated with projections 16, 17 and 18 opposite the respective openings so that when the gasket is squeezed between the pipes, pressure is concentrated on the openings. Other projections are shown between the numbered projections. Whether or not there are such other projections and the number is not critical, but their presence permits a desirable spacing of the openings with more uniform pressure on the gasket walls than if they were not present. As shown in FIGURE 5, the projections are shifted somewhat forward of the openings in the final stage of the compression of the gasket.

It is often desirable to provide positioning means in the pipe to fix the final position of the gasket which may be shifted between the pipes as they are telescoped over it. FIGURES 3–5 show a positioning member 25 welded to the bell ring 3. In a concrete pipe a positioning member may be cast in the pipe.

Referring to FIGURES 3 to 5, the gasket is first positioned against the outer pipe section, with the outer surface of the lip 27 against the surface of this section. The tip of the lip 27 is engaged by the positioning member 25 and this prevents the gasket from creeping as the pipe sections are moved into their final position. Lips 27 and 28 are substantially identical, although initially the outer surface of the lip 28 is offset inwardly from the tapering surface of the gasket and does not flare out as much as the lip 27 which lies flush against the bell ring 3. As the pipes are advanced into telescoping position they apply pressure to the projections 16, 17, 18, etc. of the gasket, and the openings 12, 13 and 14 are gradually flattened. The oval opening 12 is squeezed, first until it is substantially circular in cross section (FIGURE 4), and then it is flattened to an oval with the long axis parallel to the pipe surfaces (FIGURE 5). As this opening is flattened, the lips 27 and 28 are flared out. They each taper toward the top from a broader portion near the place that they are joined to the body of the gasket. Where they join the body there is a depression 30 in each wall, and a generally circular mouth 31 between the lips so that the lips narrow sharply to the attachment thereof to the body portion of the gasket.

As pressure is applied, the mouth is first closed, and then opening 32 which opens into the mouth is flattened as the air is squeezed out of it. As the body of the gasket is squeezed into the space formerly occupied by this opening 32, the lips are flared out. The increasing pressure on projections 16, 16 opposite opening 12, progressively flattens this opening, and this also flares the lips into ever tighter contact with the pipe surfaces. As the body of the gasket is squeezed, its bottom surface is brought into substantial alignment with the bottom surface of the lip 28. (FIGURES 4 and 5.)

When finally driven home, the gasket forms a tight seal. Liquid under pressure in the pipe (which may be as high as 250 pounds per square inch) enters the mouth between the lips and spreads the lips against the pipe surfaces, making the seal tight. The contact of the gasket with the walls at the spaced projections 16, 17, 18, etc. forms a tighter seal than is possible by continuous contact.

Figure 6:
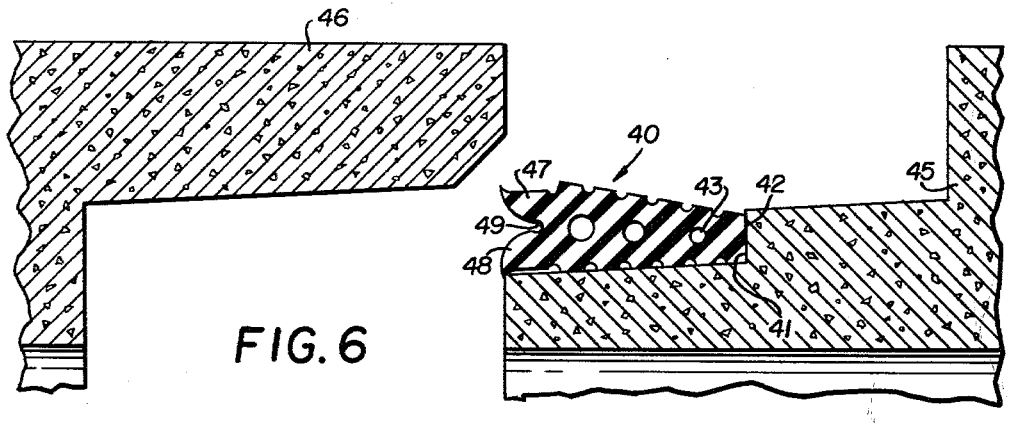
FIGURE 6 is a cross section of two pipe sections and a gasket similar to that shown in FIGURE 1 but with a blunt forward end, with the gasket positioned in an offset against a locating wall of one of the pipe sections before the sections are brought together.
Figure 7:
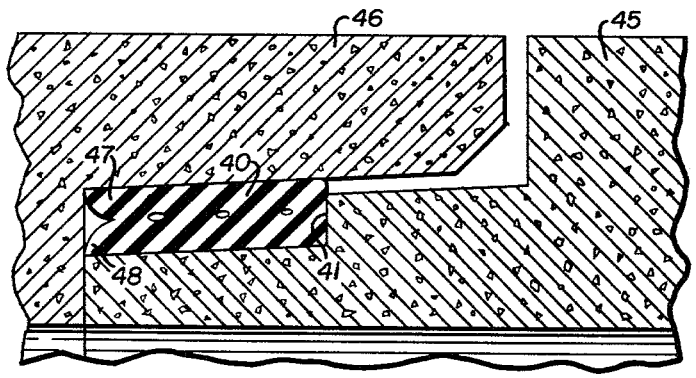
FIGURE 7 is a cross section of the same after the pipes have been brought together.

In FIGURES 6 and 7 the gasket 40 is similar to that shown in FIGURE 1, except that the front end 41 of the gasket is flat and abuts the positioning wall 42, the rear opening 43 is circular in cross section instead of being elongated, and because the gasket is initially positioned on the inner pipe section it is the outer surface of the lip 47 that is offset inwardly from the tapering outline of the body of the gasket.

Whereas in FIGURES 3 to 5 the gasket surfaces taper away from the opening between the two pipe sections so that when the pipe sections are brought together they contact increasingly wider portions of the gasket, in FIGURES 6 and 7 as the surfaces of the pipe sections 45 and 46 are brought together the first contact with the gasket is made at its wider or rear portion. Instead of the lips 47 and 48 facing away from the approaching pipe section, as the sections are brought together, they face toward the approaching section. Thus, regardless of whether the mouth of the gasket faces toward the inside of the pipe or the outside, the portion of the body adjacent the lips is advantageously thicker, because the flaring of the lips is dependent upon this portion of the body being squeezed to a substantially smaller dimension.

The outer surface of the lip 47 is offset inwardly from the tapering outer surface of the gasket and the lip 47 does not make the first contact with the pipe section 46, but the first contact is made with the widest portion of the body of the gasket. Thus, the lips are not squeezed together as the first pressure is applied, but the squeezing of the body of the gasket causes the lips to flare and the tip of the lip 47 is brought into contact with the pipe section 46. Reduction of the size of the openings 41 and 49 assists in causing the lips to flare out. As the pipe sections are brought to their final positions, shown in FIGURE 7, the outward pressure of the lips against the pipe surfaces increases.

After the pipe sections are finally brought to their final position the pressure of the lips 47 and 48 against the sections 45 and 46 is such that any liquid seeping out of the joint between the two pipe sections and entering the mouth of the gasket between the two lips 47 and 48 causes them to be brought into ever tighter contact with the pipe sections, forming a very tight seal.

Figure 8:
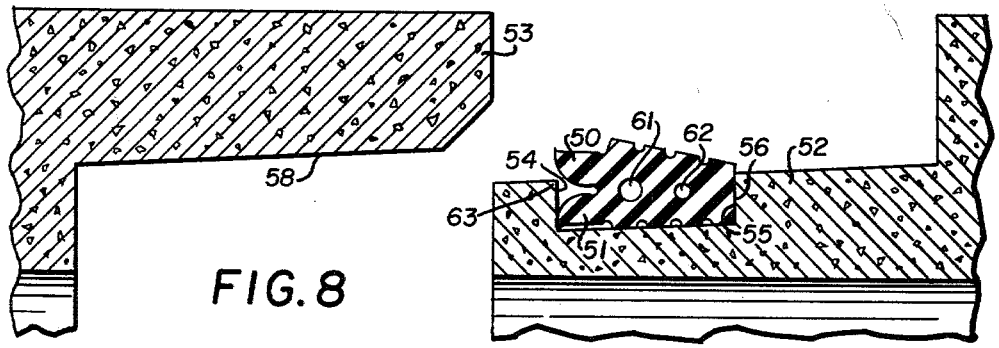
FIGURE 8 is a cross section of a truncated form of the gasket with a blunt end in a recess in a pipe with the lips of the gasket directed toward the interior of the pipe, before the pipe sections have been brought together.
Figure 9:
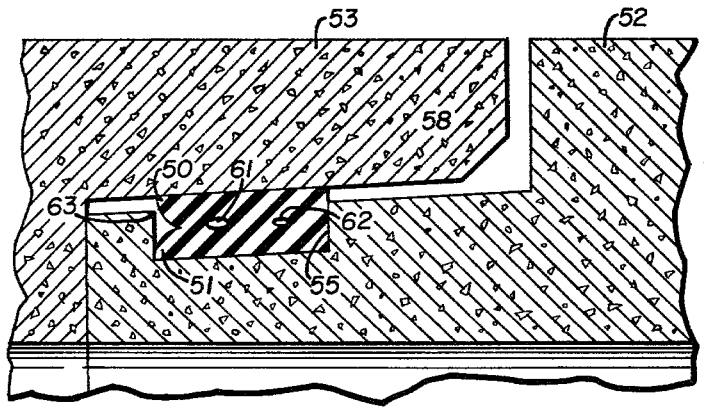
FIGURE 9 is a cross section of the same after the pipe sections have been brought together.

In FIGURES 8 and 9 a truncated form of gasket is illustrated. The lips 50 and 51 are directed toward the interior of the pipe, as in the prior figures, to make a joint which prevents loss of liquid from within the pipe. Before assembling the two pipe sections 52 and 53, the gasket is inserted in the recess 54 in the outer surface of the portion of the pipe section 52 which is the section of smaller diameter. The flat head 55 of the gasket abuts the end wall 56 of the recess, and the surface of the lip 51 is flush against the bottom of the recess.

As the pipe sections are brought together, the first contact of the section 53 with the gasket is not at the lip 50, but at the widest section of the gasket. As the pipe sections are brought closer together the gasket is squeezed tighter and tighter between them. Even under the greatest pressure the body of the gasket is thicker than the depth of the recess. As the pressure on the gasket is increased, the lip 50 flares outward making tight sealing contact with the tapering surface 58 of the section 53.

When the pipe sections have reached their final position, as shown in FIGURE 9, the openings 61 and 62 are elongated, so that when air is eventually lost from them there is only slight reduction in the pressure the body of the gasket is under. The lip 50 does not make contact with the corner 63 at the edge of the recess 54, so that liquid from within the pipe passes between the corner 63 of the pipe and the lip 50 into the mouth of the gasket and exerts outward pressure against the lips forcing their outer surfaces into tight contact with the surfaces of the sections 52 and 53.

Figure 10:
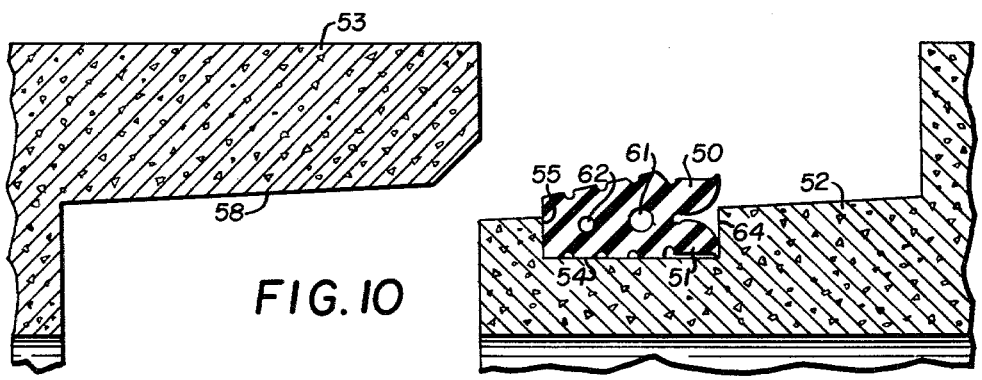
FIGURES 10 and 11 are identical with FIGURES 8 and 9, except that the lips of the gasket are directed away from the interior of the pipe.
Figure 11:
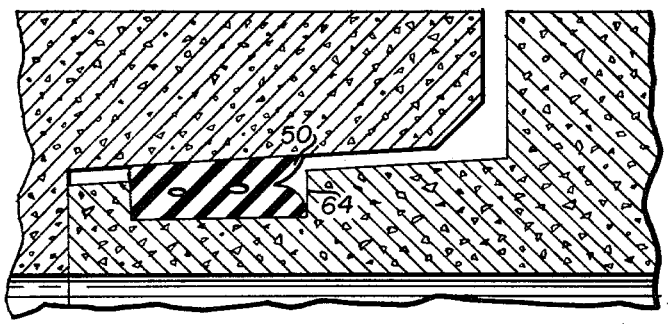

In FIGURES 10 and 11, the same two pipe sections are shown, but the position of the gasket is reversed to prevent the entrance of liquid into the pipe. The blunt end 55 of the gasket is against the wall 64 of the positioning recess 54. As the pipe sections 52 and 53 are brought together the section 53 contacts the outwardly tapering wall of the body of the gasket, exerting pressure on this before contact is made with the lip 50. As pressure is applied to the wall of the gasket the openings 61 and 62 are reduced in size and the lips 50 and 51 flare outward. The lip 51 is in contact with the bottom of the recess 64 when the gasket is put in the recess, before any pressure is applied, and eventually the lip 50 contacts the section 53 as the section 52 is telescoped into it. Before the two pipe sections reach their final position shown in FIGURE 11, the outer surface of the lip 50 has been flared into tight contact with the tapering surface 58 of the pipe section 53. When liquid under pressure enters the pipe joint from the area surrounding the pipe, it enters the mouth of the gasket between the two lips, and forces the lips into ever tighter contact with the pipe surfaces, making a tight seal.

In each of the drawings, there are openings in the body of the gasket and the surfaces of the gaskets are corrugated with projections opposite the several openings. There is a circular opening between the lips, where they join the body of the gasket. These parts of the gasket function the same in each case, even though not specifically described in connection with each of the different embodiments of the invention.

The drawings show the gasket, when originally applied to a pipe section, as being pressed against it with sufficient pressure to flatten the adjacent lip surface against it. This is a preferred arrangement. FIGURES 1 and 2 show lips with surfaces that are not flat. They may be perfectly flat, and the lip need not lie flat against the pipe surface. Furthermore, although the opposite surfaces of the gasket preferably taper toward the front of the gasket, actually the surfaces may be parallel or substantially so. The gasket is preferably made of Neoprene, although other elastomeric materials can be used.

The invention is covered in the claims which follow.

What I claim is:

1. An annular gasket of elastomeric material with a body portion and two lips extending rearwardly from the rear of the body portion, both lips narrowing sharply by depressions on both surfaces at their forward ends where they join the body portion, an opening in the body portion near the lips, and projections on said walls opposite said opening so that when the projections are squeezed the lips are flared outward, each lip tapering from a wide portion immediately to the rear of said depressions to a thin tip at the rear.

2. The gasket of claim 1, the body of which is generally tapering from the front of the gasket to a wider portion adjacent the lips.

3. The gasket of claim 1 in which there is an annular opening generally circular in cross section where the lips narrow and join the body.

4. An annular gasket with a body portion and two lips extending rearwardly from the rear of the body portion and each terminating in a thin tip, each lip tapering from a wider portion where the lips are almost in contact to said tips at their rear, the outer surface of one lip being in substantial alignment with the adjacent surface of the body portion, and the outer surface of the other lip being inset from substantial alignment with the surface of the body portion adjacent to it, there being a depression in the surface of the gasket between said last mentioned outer surface of said other lip and the surface of the body portion adjacent to it.

5. An annular gasket of elastomeric material with a body the inner and outer walls of which taper outwardly from the front of the gasket to outer and inner annular lips at the rear, a small plurality of annular openings enclosed in the gasket spaced from the front to the rear of the gasket, one of said openings being near the lips, projections on said walls opposite said last mentioned opening so that when the projections are squeezed the lips are flared outward, a depression in each wall separating each lip from the body of the gasket, each lip tapering from a wide portion immediately to the rear of said depression to a thin tip at the rear, said wide portions of the lips forming a mouth between them which widens at its front end into a small annular opening the walls of which are flattened into contact with one another when the gasket is compressed.

6. The gasket of claim 5 in which with respect to the rear annular opening which is near the lips, the axis which is substantially parallel to the gasket walls is shorter than the axis perpendicular thereto.

7. The gasket of claim 5 in which the front end is rounded, there are three enclosed openings in the gasket, the two forward ones being substantially cylindrical and with respect to the other the axis parallel to the gasket walls is shorter than the axis perpendicular thereto, and there is a projection in each wall opposite each of said enclosed openings, and one projection between each two of said projections.

8. The gasket of claim 5 in which the surfaces of said projections on the outer surface of the gasket lie substantially in one plane, and the surfaces of said projections on the inner surface of the gasket lie substantially in one plane, said planes being nearer one another at the front of the body of the gasket than at the rear thereof, the outer surfaces of the two lips flaring outwardly toward the rear, said surface of one of said lips lying generally in one of said planes, and said surface of the other lip being offset inwardly from the other plane.

References Cited in the file of this patent

UNITED STATES PATENTS

| 853,900 | Saunders | May 14, 1907 |
| 2,177,438 | Miller | Oct. 24, 1939 |
| 2,259,940 | Nathan | Oct. 21, 1941 |

FOREIGN PATENTS

| 1,150,434 | France | Jan. 13, 1958 |